United States Patent [19]

Toyoshima

[11] Patent Number: 4,831,481
[45] Date of Patent: May 16, 1989

[54] COMPOSITE MAGNETIC HEAD AND METHOD OF MANUFACTURING THE SAME

[75] Inventor: Fumitoshi Toyoshima, Nagaoka, Japan

[73] Assignee: Alps Electric Co., Ltd., Japan

[21] Appl. No.: 886,205

[22] Filed: Jul. 15, 1986

[30] Foreign Application Priority Data

Jul. 19, 1985 [JP] Japan ................................. 60-159450

[51] Int. Cl.$^4$ ........................ G11B 5/265; G11B 5/187
[52] U.S. Cl. .................................... 360/118; 360/121; 360/122
[58] Field of Search ............... 360/121, 118, 125, 126, 360/122

[56] References Cited

U.S. PATENT DOCUMENTS 3,514,851 6/1970 Perkins et al. ......................... 29/603
4,636,898 1/1987 Suzuki ................................. 360/122

FOREIGN PATENT DOCUMENTS 59-54024 3/1984 Japan ................................. 360/121
84/03984 10/1984 PCT Int'l Appl. ................. 360/121

Primary Examiner—John H. Wolff
Assistant Examiner—Matthew J. Bussan
Attorney, Agent, or Firm—Guy W. Shoup; Paul J. Winters; Stephen L. Malaska

[57] ABSTRACT

A composite magnetic head is integrally formed with a recording/reproducing head section having a recording/reproducing gap and an erasing head section having two erasing gaps. The magnetic head has formed in its surface facing a magnetic recording medium two parallel diagonal grooves extending across the two head sections which are inclined with respect to the gaps and spaced apart so as to define the outer ends of the recording/reproducing gap and respective inner ends of each of the erasing gaps.

2 Claims, 5 Drawing Sheets

COMPOSITE MAGNETIC HEAD AND METHOD OF MANUFACTURING THE SAME

BACKGROUND OF THE INVENTION

1. Field of the Invention:

The present invention relates to a composite magnetic head capable of high density recording and high density reproduction, and a method for manufacturing such a composite magnetic head.

2. Description of the Prior Art:

In a recording system employing a disc-shaped magnetic recording medium, such as a magnetic disc, having circumferential recording tracks, the leakage of magnetic flux, namely, so-called cross-feed recording on the adjacent tracks during the recording operation and so-called cross-talk between the adjacent tracks during the reproducing operation, is liable to occur when the tracks are formed with small intervals therebetween in order to increase the recording density of the magnetic recording medium.

A composite magnetic head as illustrated in FIGS. 3 and 4 has been proposed so far to solve the problem of cross talk. This composite magnetic head has a basic function to form silent guard bands each having a guard band width Te on opposite sides of a recording track having a recording with Tw recorded by a recording-/reproducing gap 10 by sweeping the outside of the recording track with a pair of erasing gaps 20. Provision of the guard bands having the guard band width Te on the opposite sides of the recording track having the recording track width Tw obviates cross-feed and cross talk between the adjacent tracks, even if the tracks are formed at a small intervals.

This conventional composite magnetic gap is formed by combining a recording/reproducing magnetic core 11 and an erasing magnetic core 21 with a nonmagnetic layer 29, such as a ceramic layer or a galss layer. The recording/reproducing magnetic core 11 is formed by joining an I-shaped half core 12 and a C-shaped half core 13 with the recording/reproducing gap 10 therebetween. The erasing magnetic core 21 is formed by joining an I-shaped half core 22 and a C-shaped half core 23 with the erasing gaps 20 therebetween. The recording-/reproducing gap 10 and the erasing gaps 20 are packed with nonmagnetic materials 14 and 24, such as a glass having a high melting point, respectively.

Grooves 15 are formed on opposite ends of the recording/reproducing gap 10 in the opposite lateral sides of the recording/reproducing magnetic core 11 so as to extend over both the half cores 12 and 13. The grooves define the track width Tw and are filled with a nonmagnetic material 16, such as glass.

A hole 25 having a lateral width Ew is formed at the middle of the erasing gap 20 so as to extend over the half cores 22 and 23. The hole 25 defines the erasing track width Te and is filled with a nonmagnetic material 26. The lateral width Ew of the hole 25 is practically the same or less than the recording/reproducing track width Tw. The longitudinal width Gl, namely, the width along the longitudinal direction of the track, of the hole 25 is twenty times that of the gap size of the erasing gap 20 or greater in order to ensure erasing effect.

Coils 17 and 27 are wound on the respective C-shaped half cores 13 and 23 of the recording/reproducing magnetic core 11 and the erasing magnetic core 21, respectively.

This conventional composite magnetic head, however, requires complicated manufacturing processes, needs high manufacturing cost and has difficulty in being manufactured in high accuracy. In manufacturing the composite magnetic head, the half cores 12 and 13 of the recording/reproducing magnetic core 11 and the half cores 22 and 23 of the erasing magnetic core 21 are formed by cutting blocks as indicated by alternate long and two short dashes lines in FIG. 3. Since the grooves 15 and the hole 25 are formed in both the half cores 12 and 13, and in both the half cores 22 and 23, respectively, the grooves 15 and the hole 25 unavoidably need to be formed before the half cores 12 and 13, and the half cores 22 and 23 are joined together. However, when the half cores 12 and 13 and the half cores 22 and 23 are joined together, respectively, after forming the grooves 15 and the hole 25, it is possible that the grooves 15 and the hole 25 deviate from the respective correct positions in joining the half cores. It is apparent that high density recording is impossible unless the grooves 15 and the hole 25 are formed at the respective correct positions. Accordingly, accurate positioning of the grooves 15 and the hole 25 requires difficult work and complicated manufacturing processes, reduces the yield and increases the manufacturing cost.

In order to enable high density recording on a rotary recording medium, it is desirable to reduce the interval l between the recording/reproducing gap 10 and the erasing gap 20 to the least possible value. However, in the conventional composite magnetic head, since the grooves 15 and the hole 25 need to be formed over the entire length of the half cores 12 and 22, respectively, the half cores 12 and 22 need to have a sufficient thickness, and hence it is difficult to reduce the interval l to a satisfactorily small value.

SUMMARY OF THE INVENTION

Accordingly, in view of those disadvantages of the conventional composite magnetic head, it is an object of the present invention to provide an inexpensive highl-fidelity composite magnetic head having a construction unaffected by machining accuracy and positioning accuracy, and to provide a method of manufacturing such a composite magnetic head.

The composite magnetic head of the present invention has been developed on the basis of the results of the reexamination of a practical knowledge that it is essential to provide recording/reproducing gap regulating grooves and an erasing gap regulating groove separately the recording/reproducing magnetic core and the erasing magnetic core, respectively. According to the present invention, continuous diagonal grooves are formed in a magnetic core having a recording/reproducing gap and an erasing gap at an inclination to these gaps to regulate one en of the recording/reproducing gap and inner ends of a pair of the erasing gaps.

A method of manufacturing a composite magnetic head according to the present invention comprises steps of: forming a magnetic core block having two continuous magnetic gaps, which are to form a recording/reproducing gap and a pair of erasing gaps, at a fixed interval therebetween, forming a plurality of diagonal grooves at an inclination to the magnetic gaps in the magnetic core block, filling the diagonal grooves with a nonmagnetic material, and cutting the magnetic core block along planes perpendicular to the magnetic gaps at regular intervals to provide magnetic core chips each having one recording/reproducing gap and a pair of erasing gaps. The distance between the two continuous magnetic gaps and the inclination angle of the diagonal grooves are decided so that the diagonal grooves in a single magnetic core chip regulate one end of the recording/reproducing gap and the inner ends of a pair of the erasing gap.

The above and other objects, features and advantages of the present invention will become more apparent from the following description of a preferred embodiment thereof taken in conjunction with the accompanying drawing.

BRIEF DESCRIPTION OF THE DRAWINGS

FIGS. 2a to 2e are perspective views of semifinished works in the successive processess of manufacturing the composite magnetic head of FIG. 1a;

DESCRIPTION OF THE PREFERRED EMBODIMENT

Figure 1A:
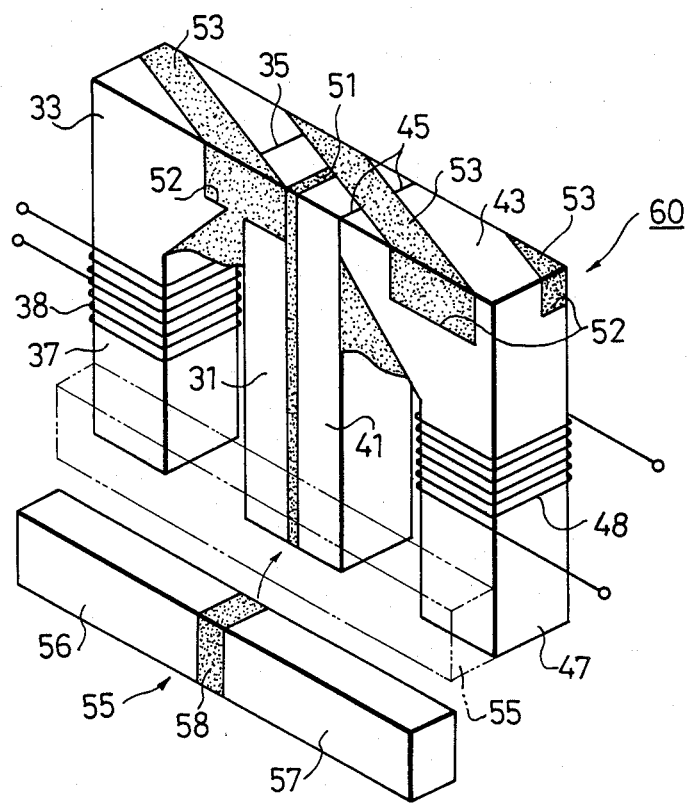
FIG. 1a is a perspective view of a complete composite magnetic head, in a preferred embodiment, according to the present invention.

FIGS. 2a to 2f illustrate the processes of manufacturing a composite magnetic head according to a method of the present invention. In this embodiment, a recording/reproducing block consists of an I-shaped block 31 and a C-shaped block 33 having a groove 32 for regulating the depth of a magnetic gap. A erasing block 40 consists of an I-shpaed block 41 and a C-shaped block 43 having a groove 42 for regulating the depth of a magnetic gap. These blocks are made of a magnetic material such as single crystal ferrite, a Mn/Zn ferrite or a Fe/Al/Si ferrite.

Figure 2A:
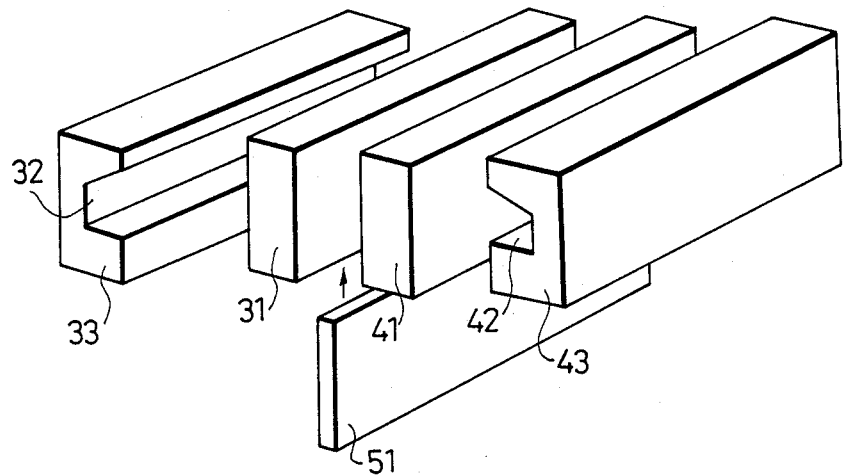
Figure 2B:
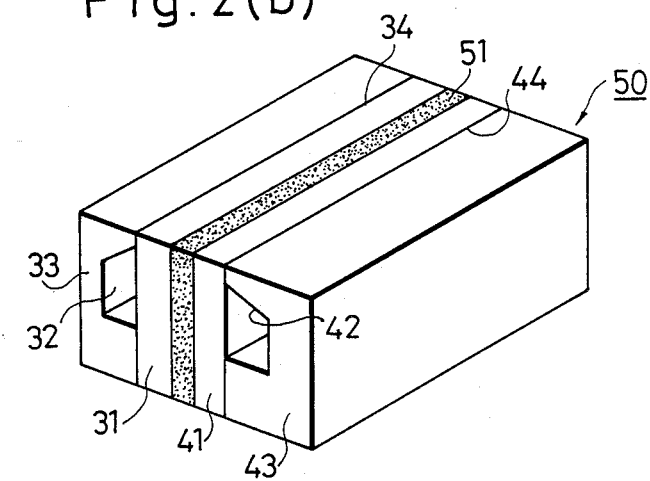

After grinding polishing the contact surfaces of these blocks the I-shaped block 31 is joined to the C-shaped block 33, the I-shaped block 41 is joined to the I-shaped block 31, and then the C-shaped block 43 is joine to the I-shaped block 41 as illustrated in FIG. 2b to construct a magnetic core block 40. A magnetic gap 34 for a recording/reproducing gap is formed between the contact surfaces of the I-shaped block 31 and the C-shaped block 33, while a magnetic gap 44 for an erasing gap is formed between the contact surfaces of the I-shaped block 41 and the C-shaped block 43. A bonding layer of a nonmagnetic material such as a glass having a high melting point or SiO$_2$ is formed at least over one of the contact surfaces of each joint through evaporation or sputtering. A spacer 51 for isolating a recording/reproducing magnetic circuit and an erasing magnetic circuit from each other is interposed between the I-shpaed blocks 31 and 41. Similarly to the conventional speacer, the spacer 51 may be made of a glass plate having a high melting point and may be welded to the contact surfaces of the I-shaped blocks 31 and 41, or may be a bonding layer formed similarly to the magnetic gaps by evaporation or sputtering. In assembling the magnetic core block 50, any particular work for aligning the component blocks is not necessary.

Figure 2C:
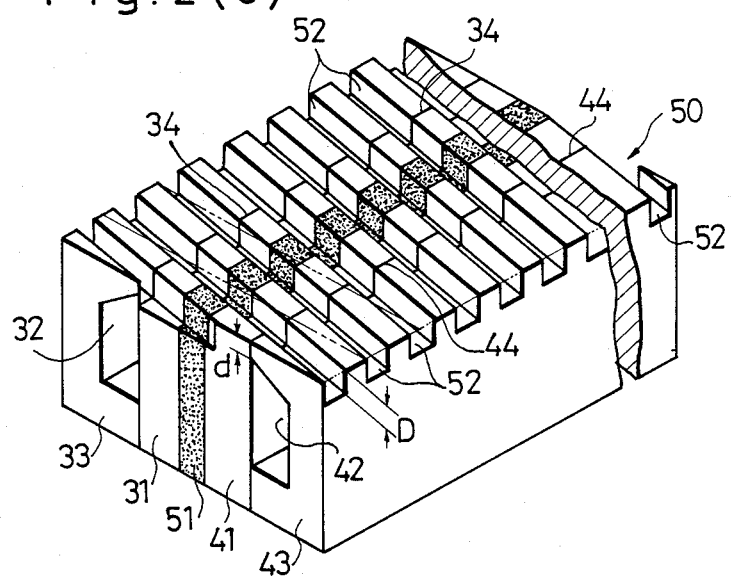
Figure 2D:
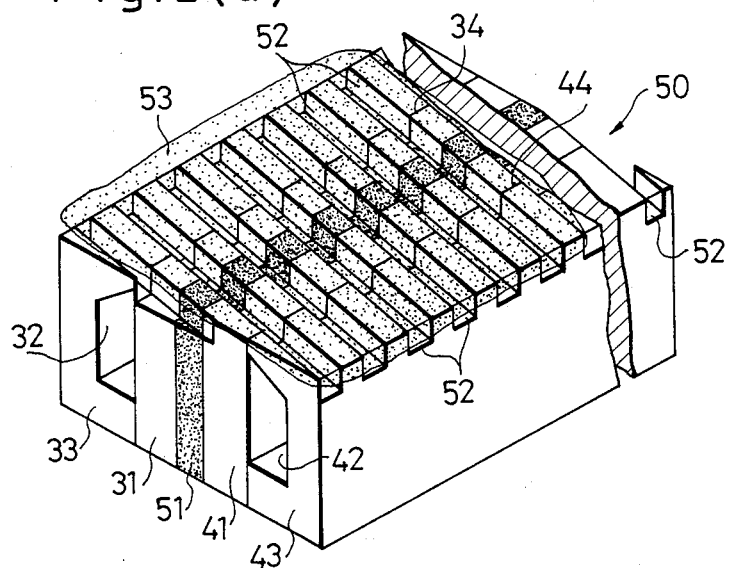
Figure 2E:
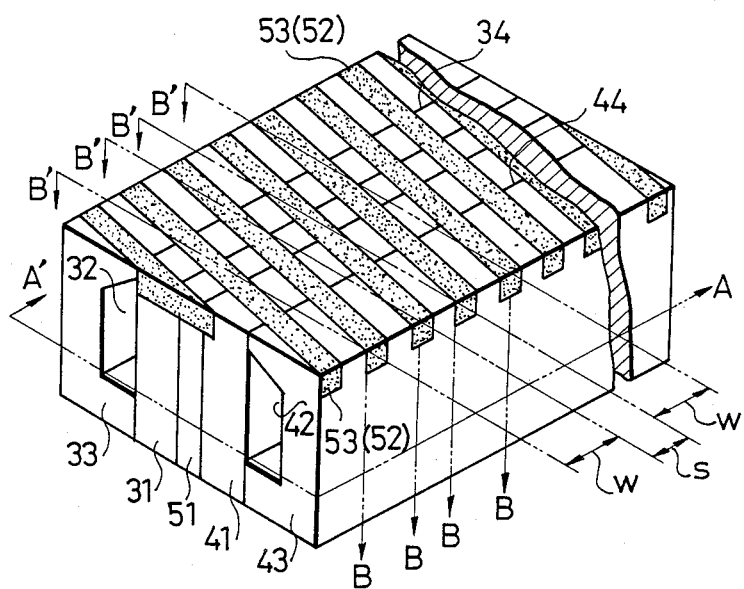

Then, a plurality of diagonal grooves 52 are formed in the surface of the magnetic core block 50 at an inclination to the magnetic gaps 34 and 44 in parallel to each other at regular intervals (FIG. 2c). The inclination angle $\theta$ of the diagonal grooves 52 to a direction perpendicular to the magnetic gaps 34 and 44 (FIG. 2f) is decided taking into consideration the interval l between the magnetic gaps 34 and 44 so that when a magnetic core chip 60 is cut out from the magnetic core block 50 one magnetic gap 34 extends in the middle of the thickness of the magnetic core chip 60 and a pair of magnetic gaps 44 extend in the opposite ends of the thickness of the same. Preferably, the inclination angle $\theta$ is in the rnage of 5 to 30 degrees. The diagonal grooves 52 have a uniform depth D (FIG. 2c), which is greater than the depth d of the magnetic gaps 34 and 44 in order to inhibit the formation of any magnetic circuit in the vicinity of the magnetic gaps 34 and 44.

Then, the diagonal grooves 52 are filled with a nonmagnetic material 53 (FIG. 2d), such as glass having a low melting point or a ceramic. When a glass having a low melting point is used as the nonmagnetic material 53, a glass block is placed over the diagonal grooves, and then the glass block is fused so that the molten glass will flow into the diagonal grooves 52. The temperature for melting the glass block must be lower than the melting point of the high melting point glass forming the spacer 51 and others. When a nonmagnetic material other than a low melting point glass, such as a ceramic, is used as the nonmagnetic material for filling the diagonal grooves 52, the nonmagnetic material may be sprayed into the diagonal grooves 52 by plasma metallizing or narrow blocks of the nonmagnetic material may be fitted in and fixed adhesively to the diagonal grooves 52.

Figure 2F:
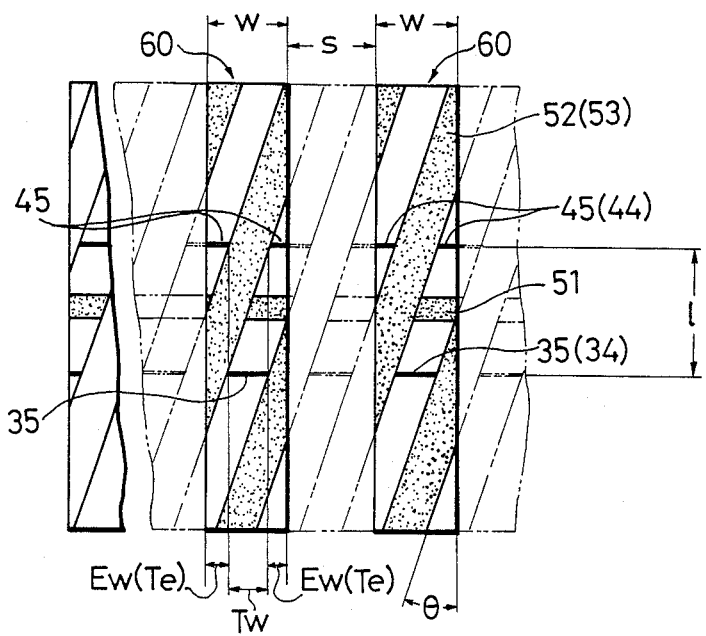
FIG. 2f is a plan view of a magnetic core block before being sliced into a plurality of composite magnetic chips.
Figure 3:
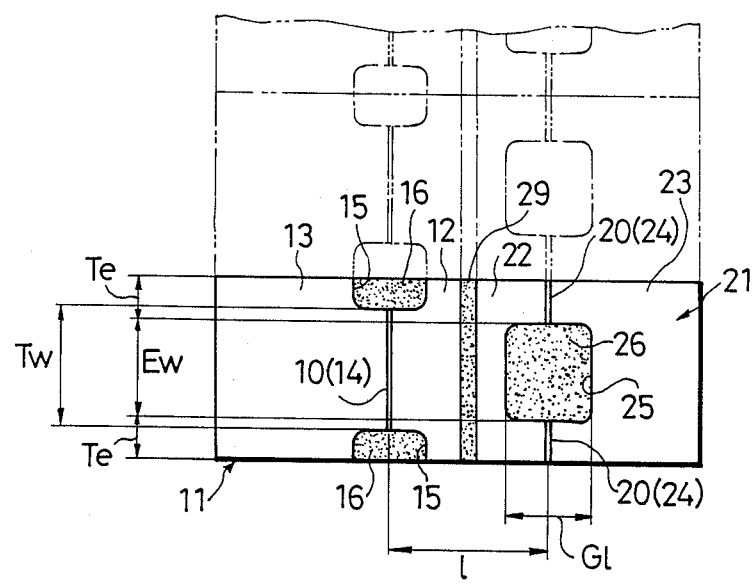
FIG. 3 is a plan view of a conventional composite magnetic head.
Figure 4:
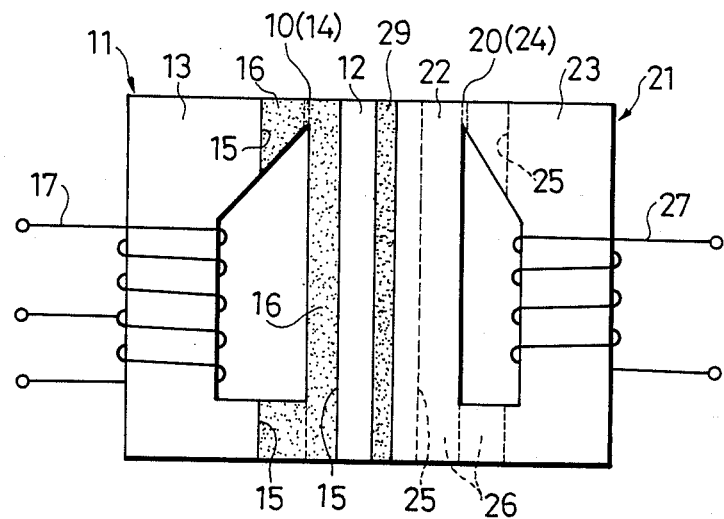
FIG. 4 is a front elevation of the composite magnetic head and FIG. 3.

Then, after the diagonal grooves 52 have been filled with the nonmagnetic material 53, the surface of the magnetic core block 50, namely, the surface which is brought into sliding contact with a magnetic recording medium, is ground and polished. Then, the magnetic core block 50 is sliced into magnetic core chips 60 having a thickness w in a cutting process. This cutting process includes a process for cutting of the unnecessary lower portion of the magnetic core block 50 along a cutting plane line A—A' and a process for slicing the magnetic core block 50 along cutting plane line B—B' perpendicular to the magnetic gaps 34 and 44. The magnetic core block 50 is sliced along the cutting plane lines B—B' with a cutting margin between the adjacent magnetic core chips 60 having the thickness w so that the magnetic gap 34 is located in the middle of the thickness and a pair of the magnetic gaps 44 are located in the opposite ends of the thickness and apart from the magnetic gap 34 in a directiom perpendicular to the magnetic gap 34. Accordingly, the interval l between the magnetic gaps 34 and 44, and the inclination angle $\theta$ of the diagonal grooves 52 must be decided appropriately. FIG. 2f illustrates, in a plan view, the magnetic core block 50 in the cutting process, in which portions to be removed are indicated by alternate long and two short dashes lines, while the magnetic core chips 60 are indicated by continuous lines.

FIG. 1a illustrates one of the magnetic core chips 60 thus formed by slicing the magnetic core block 50. In FIGS. 1a and 2f, a recording/reproducing gap 35 and erasing gaps 45 correspond to the magnetic gap 34 and the magnetic gaps 44, respectively. It is a particular feature of the present invention that the continuous diagonal groove 52 extending in the central portion of the magnetic core chip 60 regulates both one end of the recording/reproducing gap 35 and the respective inner ends of a pair of the erasing gaps 45 as illustrated in FIGS. 1a and 2f, which simplifies the manufacturing process remarkably.

As illustrated in FIG. 1a, coils 38 and 48 are wound on the legs 37 and 47 of the magnetic core chip 60, respectively, and a back bar 55 is joined to the side surface or the back surface of one end of the magnetic core chip 60 opposite to the end in which the recording-/reproducing gap 35 and the erasing gaps 45 are formed, to complete the magnetic core chip 60.

The back bar 55 is formed by joining a back bar 56 for the recording/reproducing side and a back bar 57 for the erasing side in a unit with an nonmagnetic material 58, such as a glass, therebetween. The back bar 55 is joined to the backside of the magnetic core chip 60 with the nonmagnetic material 58 in alignment with the spacer 51. A well-known bonding material, such as a glass or a resin, is used for joining the back bar 55 to the magnetic core chip 60. The back bar 56 for the recording/reproducing side and the back bar 57 for the erasing side are provided to close the respective magnetic paths of the recording/reproducing side and the erasing side, respectively. Joining the back bar 55 integrally comprising the back bars 56 and 57 with the nonmagnetic material 58 to the magnetic core chip 60 is easier than joining the back bars 56 and 57 individually to the magnetic core chip 60.

Figure 1B:
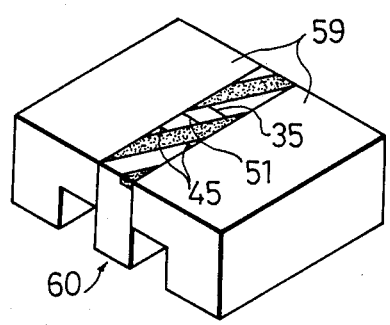
FIG. 1b is a perspective view of a combination of the composite magnetic head of FIG. 1a and sliders attached to both sides of the former.

FIG. 1b illustrates a combination of the magnetic core chip 60 and sliders 59 attached to the opposite sides of the magnetic core chip 60.

The basic performance of the magnetic head of the present invention is not deteriorated even if the other end of the recording/reproducing gap 35 of the magnetic core chip 60 shown in FIG. 1a is regulated by a groove other than the diagonal groove 52.

Although the present invention is embodied herein in a magnetic core chip in which the spacer 51 is put between the I-shaped blocks 31 and 41 to isolate the respective magnetic circuits of the recording/reproducing side and the erasing side from each other, the present invention is applicable also to a well-known composite magnetic head in which a single block is employed instead of the I-shaped blocks 31 and 41.

As apparent from the foregoing description, according to the present invention, one end of the recording-/reproducing gap and the respective inner ends of a pair of the erasing gaps are regulated by a continuous diagonal groove, and hence the composite magnetic head of the present invention can be manufactured more easily then the conventional composite magnetic head in which the respective ends of the magnetic gaps are regulated individually by separate grooves. Furthermore, in manufacturing the composite magnetic head of the present invention, work for aligning the magnetic core having the recording/reproducing gap and the magnetic core having the erasing gaps is not necessary. Still further, since the combination of the recording/reproducing core and the erasing core, namely, the magnetic core block, can be machined, an offset type composite magnetic head having a head structural accuracy can be formed without being affected by aligning accuracy and machining accuracy. Furthermore, since the magnetic core block is machined to form the diagonal grooves therein, the strength of the magnetic core is less affected by the diagonal grooves, and hence the interval between the recording/reproducing gap and the erasing gaps can be reduced and thereby the recording density is increased. Furthermore, since a plurality of the diagonal grooves are formed in the magnetic core block, the composite magnetic core chips can be produced by simply slicing the magnetic core block at regular intervals, so that the yield of the magnetic core chips is improved.

Although the invention has been described in its preferred form with a certain degree of particularity, it is to be understood that many changes and variations are possible in the invention without departing the scope of the spirit thereof.

What is claimed is:

1. A composite magnetic head integrally comprising:
   a recording/reproducing head section including a first I-shaped block extending in a vertical direction having a flat upper horizontal surface, a first C-shaped block extending in a vertical direction having a flat upper horizontal surface in parallel with the upper horizontal surface of the I-shaped block, said C-shaped block being joined to the I-shaped block on one side thereof in a horizontal longitudinal direction, and a recording/reproducing gap extending in a horizontal lateral direction perpendicular to the longitudinal direction formed at the joinder of the upper horizontal surfaces of the first two blocks;
   an erasing head section including a second I-shaped block extending in a vertical direction having a flat upper horizontal surface, a secnd C-shaped block extending in a vertical direction having a flat upper horizontal surface in parallel with the upper horizontal surface of the I-shaped block, said C-shaped block being joined to the I-shaped block on one side thereof in a horizontal longitudinal direction, and an erasing gap extending in a horizontal lateral direction perpendicular to the longitudinal direction formed at the joinder of the upper horizontal surfaces of the second two blocks;
   said recording/reproducing head section being joined to said erasing head along mutually facing vertical surfaces of the respective I-shaped blocks such that the upper horizontal surfaces of all blocks extend in parallel in the longitudinal direction, so as to form a head surface to be placed in contact with a recording medium, and the recording/reproducing gap is in parallel with the erasing gap and spaced apart therefrom in the longitudinal direction; and
   at least a pair of parallel diagonal grooves formed in the upper horizontal surfaces of the joined head sections which are spaced apart from each other by a predetermined width and are inclined at an angle to the longitudinal direction, at least one of said grooves diagonally extending across said recording/reproducing and said erasing gaps to the first and second C-shaped blocks of the two head sections, such that the recording/reproducing gap has its outer ends defined by the width between the parallel diagonal grooves, and the erasing gap is divided into two erasing gaps portions by said one groove and has each inner end of each erasing gap portion defined by said one groove, said grooves being filled with non-magnetic material.

2. A composite magnetic head according to claim 1, wherein the inclination angle of the diagonal grooves is decided so that said pair of said erasing gap portions are offset in the lateral direction with respect to the recording/reproducing gap.

* * * * *